(12) United States Patent
Nakayama

(10) Patent No.: US 10,707,543 B2
(45) Date of Patent: Jul. 7, 2020

(54) SECONDARY BATTERY

(71) Applicant: TOYOTA JIDOSHA KABUSHIKI KAISHA, Toyota-shi, Aichi-ken (JP)

(72) Inventor: Hiroyuki Nakayama, Okazaki (JP)

(73) Assignee: TOYOTA JIDOSHA KABUSHIKI KAISHA, Toyota-shi, Aichi-ken (JP)

(\*) Notice: Subject to any disclaimer, the term of this patent is extended or adjusted under 35 U.S.C. 154(b) by 368 days.

(21) Appl. No.: 15/021,817

(22) PCT Filed: Sep. 16, 2014

(86) PCT No.: PCT/IB2014/001859
§ 371 (c)(1),
(2) Date: Mar. 14, 2016

(87) PCT Pub. No.: WO2015/040471
PCT Pub. Date: Mar. 26, 2015

(65) Prior Publication Data
US 2016/0233562 A1 Aug. 11, 2016

(30) Foreign Application Priority Data
Sep. 19, 2013 (JP) .................................. 2013-194368

(51) Int. Cl.
*H01M 10/48* (2006.01)
*H01M 2/34* (2006.01)
(Continued)

(52) U.S. Cl.
CPC ........... *H01M 10/488* (2013.01); *H01M 2/30* (2013.01); *H01M 2/345* (2013.01);
(Continued)

(58) Field of Classification Search
CPC ........... H01M 10/488; H01M 10/0525; H01M 10/0587; H01M 2/345; H01M 2/30;
(Continued)

(56) References Cited

U.S. PATENT DOCUMENTS

2011/0039136 A1  2/2011  Byun et al.
2011/0052950 A1\*  3/2011  Yoo ..................... H01M 2/0413
429/90

(Continued)

FOREIGN PATENT DOCUMENTS

JP          11354100 A     12/1999
JP        2011-040391 A     2/2011
(Continued)

*Primary Examiner* — Stephen J Yanchuk
(74) *Attorney, Agent, or Firm* — Sughrue Mion, PLLC

(57) ABSTRACT

A secondary battery has a conductive member, a current interrupt device, and a pressure-sensitive member. The conductive member has an opening on an outer side of the secondary battery. The current interrupt device has a reverse plate connected with the conductive member and is provided inside the secondary battery. The pressure-sensitive member seals the opening, and a state of the pressure-sensitive member changes in accordance with an increase in pressure of a space surrounded by the reverse plate and the conductive member.

5 Claims, 4 Drawing Sheets

(51) Int. Cl.
*H01M 2/30* (2006.01)
*H01M 10/0525* (2010.01)
*H01M 10/0587* (2010.01)

(52) U.S. Cl.
CPC .... *H01M 10/0525* (2013.01); *H01M 10/0587* (2013.01); *H01M 2200/20* (2013.01)

(58) Field of Classification Search
CPC . H01M 2200/20; H01H 35/24; H01H 35/245; H01H 35/2607; H01H 35/34; H01H 35/346
See application file for complete search history.

(56) References Cited

U.S. PATENT DOCUMENTS

| | | | |
|---|---|---|---|
| 2012/0107652 A1 | 5/2012 | Iyori et al. | |
| 2013/0095352 A1* | 4/2013 | Yamauchi | H01M 2/12 |
| | | | 429/53 |
| 2016/0064723 A1* | 3/2016 | Gaugler | H01M 2/1229 |
| | | | 429/61 |

FOREIGN PATENT DOCUMENTS

| | | |
|---|---|---|
| JP | 2012-109219 A | 6/2012 |
| JP | 2012-110175 A | 6/2012 |
| JP | 2013-101890 A | 5/2013 |
| JP | 2014-107054 A | 6/2014 |

* cited by examiner

US 10,707,543 B2

SECONDARY BATTERY

CROSS REFERENCE TO RELATED APPLICATIONS

This application is a National Stage of International Application No. PCT/IB2014/001859 filed Sep. 16, 2014, claiming priority based on Japanese Patent Application No. 2013-194368 filed Sep. 19, 2013, the contents of all of which are incorporated herein by reference in their entirety.

BACKGROUND OF THE INVENTION

1. Field of the Invention

The invention relates to a secondary battery, and more specifically to a secondary battery having a current interrupt device.

2. Description of Related Art

A secondary battery is disclosed in, for example, Japanese Patent Application Publication No. 2012-109219 (JP 2012-109219 A), Japanese Patent Application Publication No. 2012-110175 (JP 2012-110175 A), Japanese Patent Application Publication No. 2011-40391 (JP 2011-40391 A), Japanese Patent Application Publication No. 2013-101890 (JP 2013-101890 A), and Japanese Patent Application Publication No. 11-354100 (JP 11-354100 A).

SUMMARY OF THE INVENTION

In a current interrupt device for a secondary battery, it is not possible to confirm an operation of the current interrupt device from outside the battery. Therefore, there has been a problem that, in a case where current is interrupted, it is impossible to determine whether the current interruption is caused by a decrease in voltage, an operation of a current interrupt device, or a battery failure such as short circuit.

The invention has been accomplished in order to solve the above-mentioned problem, and an object of the invention is to provide a secondary battery that is capable of confirming whether or not a current interrupt device operates from outside.

According to a first aspect of the invention, a secondary battery includes a conductive member, a current interrupt device, and a pressure-sensitive member. The conductive member has an opening on an outer side of the secondary battery. The current interrupt device that has a reverse plate connected with the conductive member and is provided inside the secondary battery. The a pressure-sensitive member seals the opening, and a state of the pressure-sensitive member changes in accordance with an increase in pressure of a space surrounded by the reverse plate and the conductive member.

In the secondary battery structured as above, a state of the pressure-sensitive member changes in accordance with an increase in pressure of the space surrounded by the reverse plate and the conductive member. Therefore, by visually recognizing the state of the pressure-sensitive member from outside, it is possible to confirm whether or not the current interrupt device operates.

In the above-mentioned aspect, the space surrounded by the reverse plate and the conductive member may be an enclosed space, and pressure of the enclosed space after the current interrupt device operates may be higher than pressure of the enclosed space before the current interrupt device operates.

In this case, even when inner pressure of the secondary battery increases, the pressure increase is not transmitted to the pressure-sensitive member, and the state of the pressure-sensitive member changes only when the reverse plate is reversed and pressure inside the enclosed space is increased. Therefore, it is possible to prevent failure of the pressure-sensitive member.

In the foregoing aspect, an inner diameter of a portion of the reverse plate, which comes into contact with the enclosed space, may be larger than an inner diameter of the opening.

In the foregoing aspect, the pressure-sensitive member opens in accordance with an increase in pressure of the space surrounded by the reverse plate and the conductive member.

In this case, since the pressure-sensitive member opens, it is possible to visually confirm a changed state of the pressure-sensitive member easily from outside.

In the foregoing aspect, the current interrupt device may have a collector terminal inside the secondary battery. The reverse plate and the collector terminal may be in contact with each other before the current interrupt device operates, and the reverse plate and the collector terminal may be separated from each other after the current interrupt device operates.

The reverse plate moves in a direction away from the collector terminal by being pressed by gas inside the secondary battery.

In the secondary battery according to this invention, it is possible to confirm whether or not the current interrupt device operates by visually recognizing the state of the pressure-sensitive member from outside.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
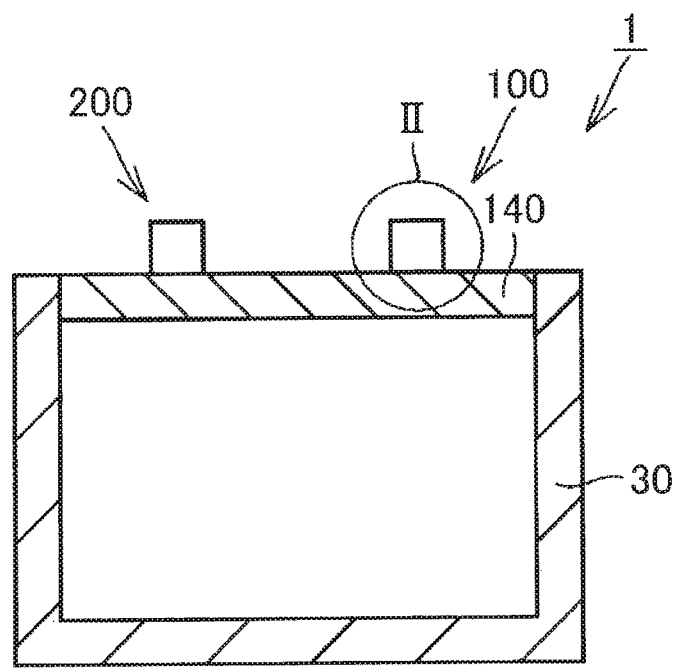
FIG. 1 is a schematic view of a secondary battery according to an embodiment.

An embodiment of the invention is explained below with reference to the drawings. In the embodiment described below, the same reference numerals are used for the same or corresponding parts, and explanation of thus parts is not repeated.

FIG. 1 is a schematic view of a secondary battery of an embodiment. With reference to FIG. 1, a secondary battery 1 has a structure in which a positive electrode and a negative electrode are laminated through a separator impregnated with an electrolytic solution, and the positive electrode and the negative electrode are wound inside a battery case 30.

A positive electrode 100 and a negative electrode 200 project from the battery case 30, and the positive electrode 100 and the negative electrode 200 are connected with a wound body inside the case. The battery case 30 may have various shapes such as an angular shape and a columnar shape. The positive electrode 100 and the negative electrode 200 are arranged in a sealing plate 140 provided on an end surface of the battery case 30.

Figure 2:
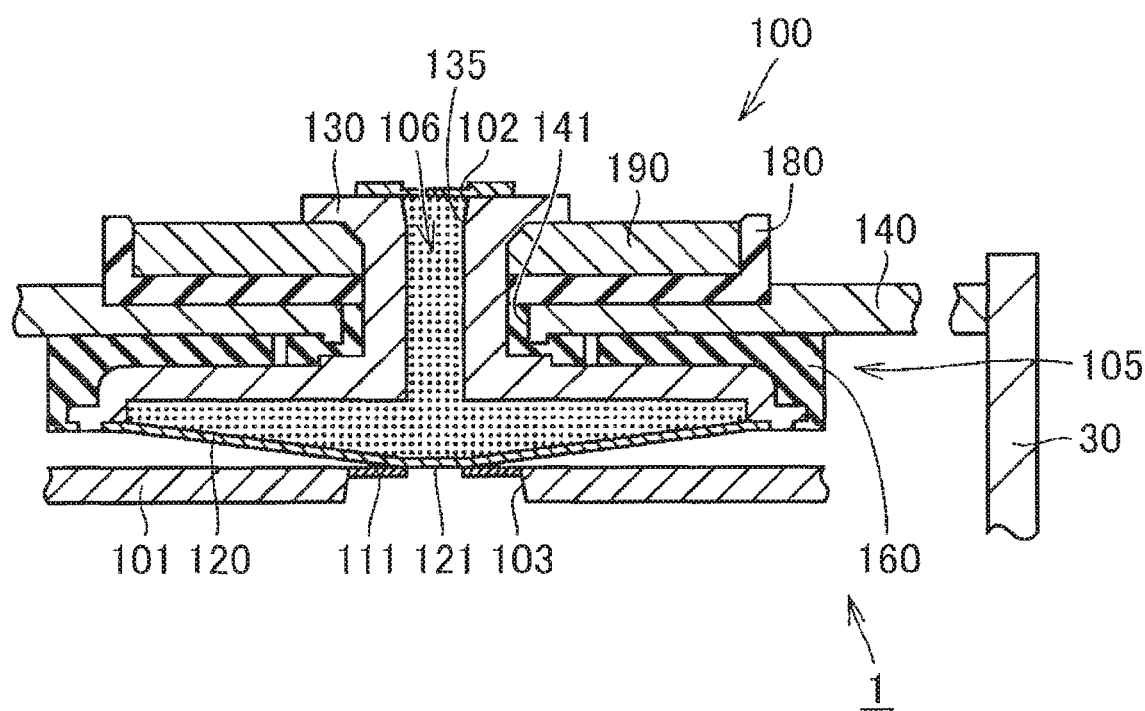
FIG. 2 is an enlarged sectional view of a portion surrounded by II in the secondary battery shown in FIG. 1, and is a sectional view before the current interrupt device operates.

FIG. 2 is an enlarged sectional view of a portion surrounded by II in the secondary battery shown in FIG. 1, and is a sectional view before a current interrupt device operates. With reference to FIG. 2, the positive electrode 100 of the secondary battery 1 is provided in the sealing plate 140. A through hole 141 is formed in the sealing plate 140, and a connection terminal 130 serving as a caulking portion is fitted into the through hole 141

A sealing member 160 is located on an inner side of the sealing plate 140 (inside the battery case 30). The sealing member 160 functions to prevent leakage of the electrolytic solution inside the battery case 30.

The connection terminal 130 has a shape in which a diameter increases inside the battery case 30, and a reverse plate 120 is welded to the large-diameter portion of the connection terminal 130. The reverse plate 120 has a disc shape where a center portion projects in an axis direction. An opening 135 of the connection terminal 130 extends from inside of the secondary battery 1 to outside.

The collector terminal 101 is arranged inside the battery case 30. Inner pressure of the secondary battery is applied to a through hole 103 of the collector terminal 101.

An electrolytic solution is enclosed in the battery case 30. As a kind of the electrolytic solution, a nonaqueous electrolytic solution is used in a case where a lithium ion battery is used as the secondary battery 1. The nonaqueous electrolytic solution may contain a nonaqueous solvent, lithium salt serving as a supporting electrolyte, as well as an additive. The secondary battery 1 is not necessarily limited to a lithium secondary battery, and only needs to be a secondary battery that uses an electrolytic solution.

A current interrupt device (CID) 105 includes the reverse plate 120. A pressure-sensitive surface 121 of the reverse plate 120 is welded to a thin portion 111 of the collector terminal 101.

An outer periphery portion of the connection terminal 130 is covered with the sealing member 160. Therefore, it is possible to prevent current from flowing from the electrolytic solution 40 through the outer periphery portion of the connection terminal 130.

Before the current interrupt device 105 operates, current flows in the collector terminal 101, the thin portion 111, the pressure-sensitive surface 121, the reverse plate 120, and the connection terminal 130. Thus, power is supplied outside from the secondary battery 1. Current flows in an opposite direction while charging.

An insulator 180 and an external terminal 190 are provided on an outer side of the sealing plate 140. The external terminal 190 is electrically connected with external devices such as an inverter and a motor.

A space 106 inside the connection terminal 130 is an enclosed space, and is filled with gas. Inside of the connection terminal 130 does not necessarily have to be an enclosed space. The connection terminal 130 and the reverse plate 120 are provided coaxially with each other.

A pressure-sensitive member 102 is provided so as to cover the opening 135 and the space 106. The pressure-sensitive member 102 is arranged at a location where the pressure-sensitive member 102 is visible from outside. The pressure-sensitive member 102 is fixed to the connection terminal 130.

Figure 3:
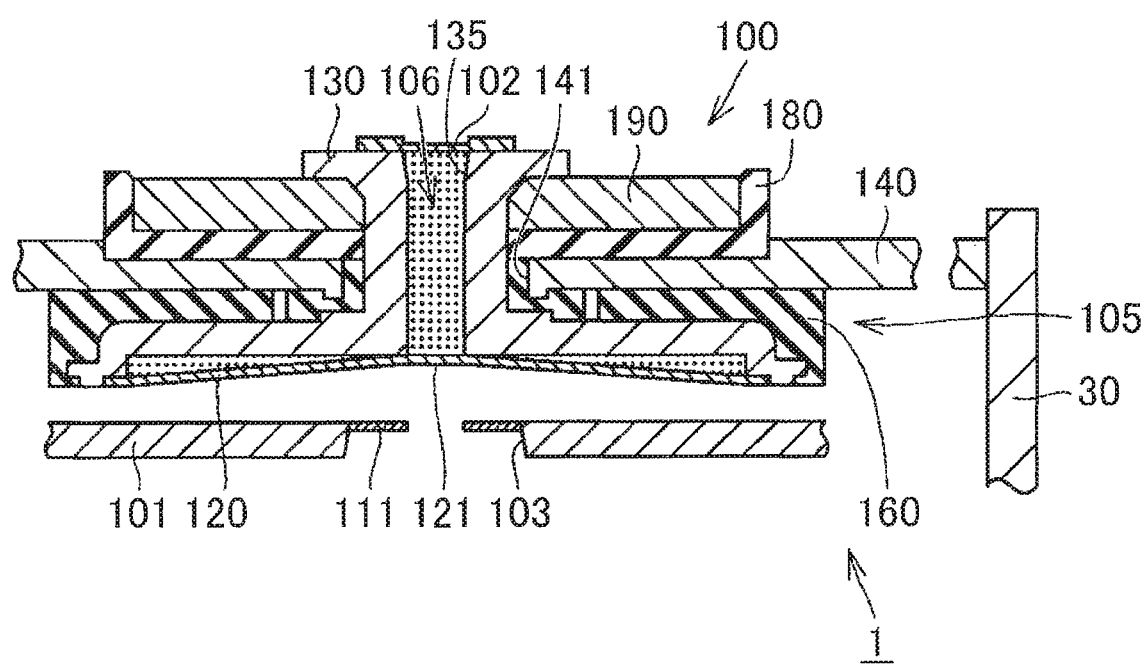
FIG. 3 is a sectional view of the secondary battery shown in FIG. 2 after the current interrupt device operates.

FIG. 3 is a sectional view of the secondary battery shown in FIG. 2 after the current interrupt device operates. With reference to FIG. 3, when inner pressure of the battery case 30 is increased, the pressure-sensitive surface 121 is pressed by the gas inside the battery case 30. At this time, pressure of the gas is evenly applied to the pressure-sensitive surface 121. Since the thin portion 111 has lower rigidity than the rest of the part, the thin portion 111 is broken, and the reverse plate 120 moves in a direction away from the collector terminal 101. Then, as shown in FIG. 3, the collector terminal 101 and the reverse plate 120 are separated from each other, and electrical conduction is interrupted.

Figure 4:
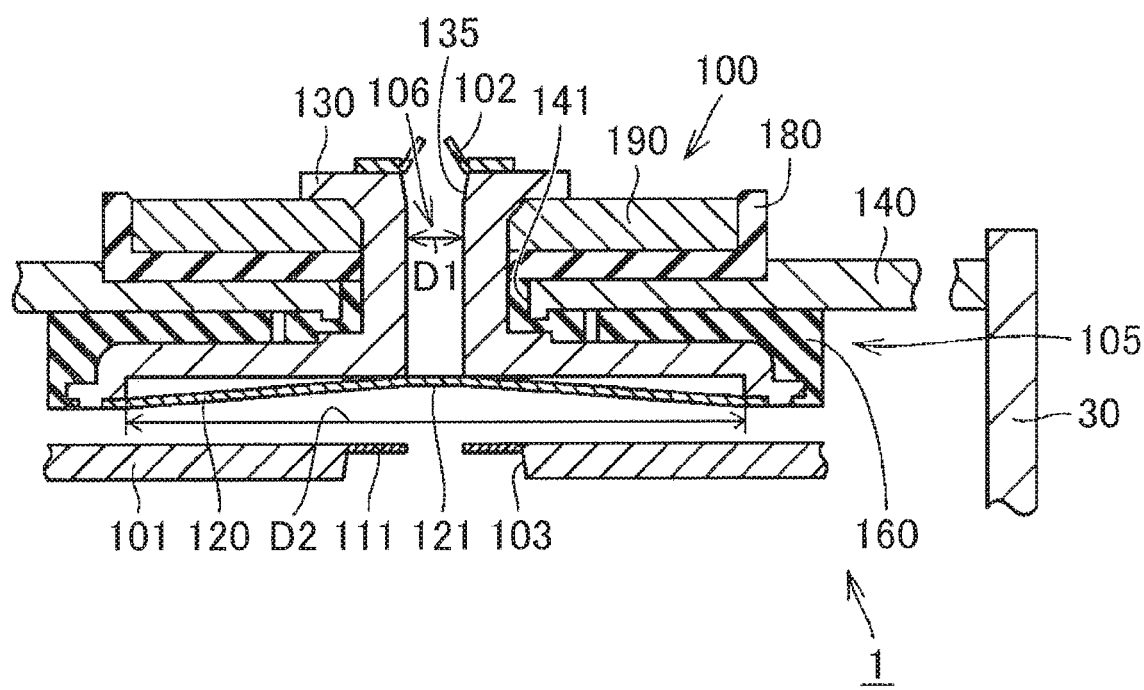
FIG. 4 is a sectional view of the secondary battery shown in FIG. 2, showing a state where a pressure-sensitive member is open.

FIG. 4 is a sectional view of the secondary battery shown in FIG. 2, showing a state where the pressure-sensitive member is open. With reference to FIG. 4, when pressure of the space 106 inside the connection terminal 130 increases, the pressure-sensitive member 102 opens. Since the opened pressure-sensitive member 102 is visible from outside, it is possible to recognize that the current interrupt device 105 operates by seeing that the pressure-sensitive member 102 is open.

The pressure-sensitive member 102 is not limited to a type that opens in accordance with pressure, but may be any type in which a change in state such as rupture, swelling, and a color change, is recognizable from outside.

The secondary battery 1 structured as stated above includes the connection terminal 130 serving as a conductive member having the opening 135 on outer side of the secondary battery 1, the current interrupt device 105 that has the reverse plate 120 connected with the connection terminal 130 and is provided inside the secondary battery 1, and the pressure-sensitive member 102 that seals the opening 135. A state of the pressure-sensitive member 102 changes in accordance with an increase in pressure of the space 106 surrounded by the reverse plate 120 and the connection terminal 130.

Because the current interrupt device 105 is inside the secondary battery 1, it is difficult to directly recognize whether or not the current interrupt device 105 operates from outside of the secondary battery 1. The current interrupt device 105 operates in an overcharge condition, and a conduction path is interrupted. Measurement of voltage is thus becomes impossible. However, it is not possible to confirm from outside whether the fact that voltage measurement cannot be done is caused by an operation of the current interrupt device 105 or other defects of the secondary battery (such as a welding defect). In this embodiment, it is possible to recognize an operation of the current interrupt device 105 from outside by providing the pressure-sensitive member 102.

In the secondary battery 1, when the space 106 is an enclosed space, pressure of the space 106 after the current interrupt device 105 operates is higher than pressure of the space 106 before the current interrupt device 105 operates. In this case, since the reverse plate 120 is reversed and pressure inside the enclosed space increases rapidly, it is possible to ensure that a state of the pressure-sensitive member is changed. In other words, the pressure-sensitive member 102 is opened by using a pressure increase caused by a decrease in volume of the space 106 when the reverse plate 120 is reversed.

When the space 106 is not an enclosed space, pressure inside the battery case 30 and pressure inside the space 106 are equal to each other. Therefore, pressure inside the battery case 30 is increased, and the pressure is applied to the pressure-sensitive member 102. Therefore, a state of the pressure-sensitive member 102 could change due to an increase in pressure inside the battery case 30 before the reverse plate 120 is reversed. On the contrary, when the space 106 is an enclosed space, the above-mentioned problem does not happen. Thus, it is preferred that the space 106 is an enclosed space.

Where valve opening pressure of the pressure-sensitive member 102 is P, pressure and volume of the space 106 shown in FIG. 2 are P1 and V1, respectively, and pressure and volume of the space shown in FIG. 3 are P2 and V2, respectively, P1<P<P2 for the pressure, and V2<V1 for the volume.

An inner diameter D2 of a portion of the reverse plate 120 that comes into contact with the space 106 is larger than an inner diameter D1 of the opening 135. As a result, when the reverse plate 120 is reversed, inner pressure of the space 106 increases rapidly, thereby ensuring that the pressure-sensitive member 102 is open.

The embodiment of the invention has been explained so far, but various modifications are possible in the embodiment explained herein. First of all, not only a lithium secondary battery, but also various types of secondary batteries having an electrolytic solution may be used as the secondary battery 1. Further, the secondary battery may be used for a vehicle, and for stationary and mobile purposes.

The embodiment disclosed herein is an example in every aspect, and should not be considered restrictive. The scope of the invention is not the description above, but is defined by the scope of the claims, and is intended to include meaning equivalent to the scope of the claims, and every change within the scope.

The invention may be used in a field of a secondary battery having a current interrupt device.

The invention claimed is:

1. A secondary battery comprising:
a conductive member having a hollow space inside the conductive member, and an opening on an outer side of the secondary battery;
a current interrupt device that has a reverse plate connected to the conductive member, the current interrupt device being provided inside the secondary battery;
wherein the hollow space communicates with a space surrounded by the reverse plate and the conductive member to form an enclosed space that is filled with gas, wherein a pressure inside the enclosed space is higher after the current interrupt device operates than before the current interrupt device operates;
a pressure-sensitive member fixed to the conductive member and configured to seal the opening of the conductive member, a state of the pressure-sensitive member changing in accordance with an increase in pressure of the enclosed space surrounded by the reverse plate and the conductive member, wherein the pressure-sensitive member is entirely disposed on the outer side of the secondary battery and visible from the outer side of the secondary battery while being fixed to the conductive member before the current interrupt device operates and after the current interrupt device operates;
a battery case defining an outer perimeter of the secondary battery; and
a sealing plate provided at an end surface of the battery case with a positive electrode and a negative electrode arranged within the sealing plate, wherein the sealing plate has a through hole formed therein, and the conductive member is provided in the through hole so that a portion of the conductive member that extends outside each end of the through hole has a diameter greater than an inner diameter of the through hole, wherein the opening of the conductive member extends from an inner area of the secondary battery to an area outside the secondary battery, wherein the change of state of the pressure-sensitive member is a change of a color of the pressure-sensitive member that changes in response to the increase in pressure in the enclosed space after the current interrupt device operates.

2. The secondary battery according to claim 1, wherein an inner diameter of a portion of the reverse plate, which comes into contact with the enclosed space, is larger than an inner diameter of the opening.

3. The secondary battery according to claim 1, wherein the pressure-sensitive member opens in accordance with an increase in pressure of the space surrounded by the reverse plate and the conductive member.

4. A secondary battery according to claim 1, wherein the current interrupt device has a collector terminal inside the secondary battery,
the reverse plate and the collector terminal are in contact with each other before the current interrupt device operates, and
the reverse plate and the collector terminal are separated from each other after the current interrupt device operates.

5. The secondary battery according to claim 4, wherein the reverse plate moves in a direction away from the collector terminal by being pressed by gas inside the secondary battery.

* * * * *